US008745274B2

(12) United States Patent
Sato

(10) Patent No.: US 8,745,274 B2
(45) Date of Patent: Jun. 3, 2014

(54) STORAGE DEVICE, HOST DEVICE, CIRCUIT BOARD, LIQUID RECEPTACLE, AND SYSTEM

(75) Inventor: Jun Sato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 179 days.

(21) Appl. No.: 13/243,734

(22) Filed: Sep. 23, 2011

(65) Prior Publication Data

US 2012/0074031 A1 Mar. 29, 2012

(30) Foreign Application Priority Data

Sep. 27, 2010 (JP) ................................ 2010-214844

(51) Int. Cl.
*G06F 3/00* (2006.01)
*G06F 13/28* (2006.01)

(52) U.S. Cl.
USPC .......................... 710/1; 710/3; 710/4; 710/26

(58) Field of Classification Search
USPC ................................................ 710/1, 3, 4, 26
See application file for complete search history.

(56) References Cited

U.S. PATENT DOCUMENTS 5,561,825 A * 10/1996 Yamagami et al. ............. 710/58
6,539,446 B1 * 3/2003 Chan ............................ 710/200
6,717,694 B1 * 4/2004 Fukunaga et al. ........... 358/1.16
7,012,928 B2 * 3/2006 Shibasaki et al. ............. 370/449
7,610,431 B1 * 10/2009 Watkins et al. ............... 710/312
7,697,372 B2 4/2010 Asauchi
7,870,318 B2 * 1/2011 Karaki .......................... 710/105
7,895,375 B2 * 2/2011 Tsukamoto et al. ............ 710/59
2006/0095693 A1 * 5/2006 Aida et al. .................... 711/154
2006/0236001 A1 * 10/2006 Tanabe ............................ 710/22
2006/0282573 A1 * 12/2006 Maeda et al. .................. 710/62

FOREIGN PATENT DOCUMENTS

EP 2 237 161 A1 10/2010
JP 03-080357 A 4/1991
JP 2002-014870 A 1/2002
JP 2002-366506 A 12/2002
JP 2006-119954 A 5/2006
JP 2009-037636 A 2/2009
JP 2010-257446 A 11/2010

* cited by examiner

*Primary Examiner* — Idriss N Alrobaye
*Assistant Examiner* — Getente A Yimer
(74) *Attorney, Agent, or Firm* — Kilpatrick Townsend & Stockton LLP

(57) ABSTRACT

A storage device includes a control unit that carries out a communication process with a host device that is connected via a bus; a storage unit into which data from the host device is written; and a storage control unit that controls access to the storage unit. The control unit returns an acknowledgment to the host device in the case where the control u has received acknowledgment return request information broadcasted from the host device to a plurality of storage devices connected to the bus after the end of a period in which data is written into the plurality of storage devices by the host device, and the data has been successfully written into the storage unit of the storage device to which the control unit belongs.

17 Claims, 8 Drawing Sheets

STORAGE DEVICE, HOST DEVICE, CIRCUIT BOARD, LIQUID RECEPTACLE, AND SYSTEM

BACKGROUND

1. Technical Field

The present invention relates to storage devices, host devices, circuit boards, liquid receptacles, systems, and the like.

2. Related Art

Some ink cartridges (liquid receptacles) used in ink jet printers are provided with storage devices. Information such as the color of the ink, the amount of ink that is consumed, and so on is stored in such a storage device. Data regarding the amount of ink that is consumed is sent from the main printer unit (a host device) to the storage device, and is written into a non-volatile memory or the like included in the storage device. With such a system, the host device is notified that the data has been successfully written by the storage device returning an acknowledgment. In other words, the storage device receives the data from the host device, writes the data into the memory, and returns an acknowledgment to the host device after the data has been successfully written. Upon receiving the acknowledgment, the host device sends data to the next storage device. Normally, writing data into the non-volatile memory requires significantly more time than communicating the data, and thus increasing the number of storage devices leads to an increase in the overall time required for the write processes.

Meanwhile, because ink cartridges are normally configured to be replaceable, it is easy for contact problems to occur at the areas that form electrical connection portions, and there is thus the risk of communication errors, write errors, and so on occurring due to connection problems. It is desirable to reduce the amount of processing time for writing from the host device to the storage devices in order to suppress the occurrence of such problems.

In response to this problem, JP-A-2002-14870, for example, discloses a method for writing data to a plurality of storage devices simultaneously. However, there are problems with this method as well, such as that the host device cannot receive an acknowledgment from each of the storage devices.

SUMMARY

It is an advantage of some aspects of the invention to provide a storage device, a host device, a circuit board, a liquid receptacle, and a system and the like capable of sending and receiving several acknowledgments collectively, and capable of reducing write processing time.

A storage device according to an aspect of the invention includes a control unit that carries out a communication process with a host device that is connected via a bus; a storage unit into which data from the host device is written; and a storage control unit that controls access to the storage unit. The control unit returns an acknowledgment to the host device in the case where the control unit has received acknowledgment return request information broadcasted from the host device to a plurality of storage devices after the end of a period in which data is written into the plurality of storage devices connected to the bus by the host device, and the data has been successfully written into the storage unit of the storage device to which the control unit belongs.

According to this aspect of the invention, the storage device can return the acknowledgment to the host device after the period in which the host device writes the data into the plurality of storage devices connected to the bus has ended. By doing so, the host device can collectively receive the acknowledgments from the storage devices after the data has been written into the plurality of storage devices. As a result, the host device can determine whether or not the data has been written successfully into each of the storage devices, and the amount of time required for the process of writing the data from the host device into the plurality of storage devices can be reduced. Furthermore, it is possible to reduce communication errors, write errors, and so on caused by contact problems and so on at the areas that form electrical connections in the storage devices.

According to another aspect of the invention, it is preferable that the control unit return the acknowledgment to the host device in a return period that, of first through nth (where n is an integer greater than or equal to 2) return periods that follow the reception of the acknowledgment return request information, is an mth (where m is an integer greater than or equal to 1 and less than or equal to n) return period that corresponds to ID information of the storage device to which the control unit belongs.

By doing so, the storage device can return the acknowledgment in the mth return period that corresponds to the ID information of that storage device, and therefore the host device can specify storage devices that return the acknowledgment and storage devices that do not return the acknowledgment.

According to another aspect of the invention, it is preferable that the storage device further include a clock terminal and a data terminal, and in the mth return period, the control unit output a signal of a logical level that expresses the acknowledgment to the data terminal based on a clock inputted to the clock terminal.

By doing so, the storage device can output a signal of a logical level that expresses an acknowledgment based on the clock, and can therefore return the acknowledgment at the correct timing in the mth return period that corresponds to the ID information of that storage device.

According to another aspect of the invention, it is preferable that, in the mth return period, the control unit change the voltage level of the data terminal from a high-impedance state to a first logical level and then change the voltage level from the first logical level to a second logical level, and in periods aside from the mth return period, set the voltage level of the data terminal to the high-impedance state.

By doing so, the voltage level of the data terminal can be quickly changed from the first logical level to the second logical level in the second half of, for example, the mth return period, and it is therefore possible to reduce the length of the return period. As a result, it is possible to reduce the overall amount of time required for the write processes.

According to another aspect of the invention, it is preferable that the control unit receive, as the acknowledgment return request information, a broadcasted command requesting the acknowledgment to be returned.

Doing so makes it possible for the host device to request a plurality of storage devices connected to the bus to return acknowledgments at the same time.

According to another aspect of the invention, it is preferable that the control unit receive, as the acknowledgment return request information, ID information specifying the plurality of storage devices.

Doing so makes it possible for the host device to request the plurality of storage devices to return acknowledgments at the same time, by sending ID information specifying the plurality of storage devices.

A host device according to another aspect of the invention includes a communication processing unit that carries out communication processes with a plurality of storage devices connected via a bus; and a control unit that controls the communication processing unit. After the end of a period for writing data into the plurality of storage devices, the communication processing unit broadcasts acknowledgment return request information to the plurality of storage devices and receives acknowledgments from the plurality of storage devices.

According to this aspect of the invention, the host device can collectively receive the acknowledgments from the plurality of storage devices after the data has been written into the storage devices. As a result, the host device can determine whether or not the data has been written successfully into each of the storage devices, and the amount of time required for the process of writing the data from the host device into the plurality of storage devices can be reduced. Furthermore, it is possible to reduce communication errors, write errors, and so on caused by contact problems and so on at the areas that form electrical connection portions in the storage devices.

According to another aspect of the invention, in each return period of first through nth (where n is an integer greater than or equal to 2) return periods that follow the sending of the acknowledgment return request information, it is preferable that an acknowledgment be received from a storage device having ID information that corresponds to the return period.

By doing so, the host device can receive the acknowledgments in the return periods that correspond to the ID information of the respective storage devices, and can therefore specify storage devices that return the acknowledgment and storage devices that do not return the acknowledgment.

According to another aspect of the invention, it is preferable that the host device further include a clock terminal and a data terminal, and after the acknowledgment return request information has been outputted to the data terminal, a clock for receiving the acknowledgment be outputted to the clock terminal.

By doing so, the host device can receive the acknowledgments based on the clock, and can therefore receive the acknowledgments at the correct timing in the return periods that correspond to the ID information of the respective storage devices.

According to another aspect of the invention, assuming the length of a write required time period for writing the data into each of the plurality of storage devices is tTM and the length of an acknowledgment wait period is tTW, it is preferable that the acknowledgment return request information be outputted after the passage of an acknowledgment wait period that fulfills the relationship $tTM \leq tTW < 2 \times tTM$.

By doing so, the host device can stand by until data has been successfully written into the final storage device, from among the plurality of storage devices, to which the data was sent, and that storage device is capable of returning an acknowledgment, and can then output the acknowledgment return request information. By doing so, it is possible to receive, with certainty, the acknowledgment from the storage device to which data has finally been sent.

A circuit board according to another aspect of the invention includes a storage device as described above.

A liquid receptacle according to another aspect of the invention includes a storage device as described above.

A system according to another aspect of the invention includes a storage device as described above and a host device as described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention will be described in detail. Note that the embodiment described hereinafter is not intended to limit the content of the invention as described in the aspects of the invention in any way, and not all of the configurations described in this embodiment are required as the methods to solve the problems as described above.

1. Storage Devices and Host Device

Figure 1:
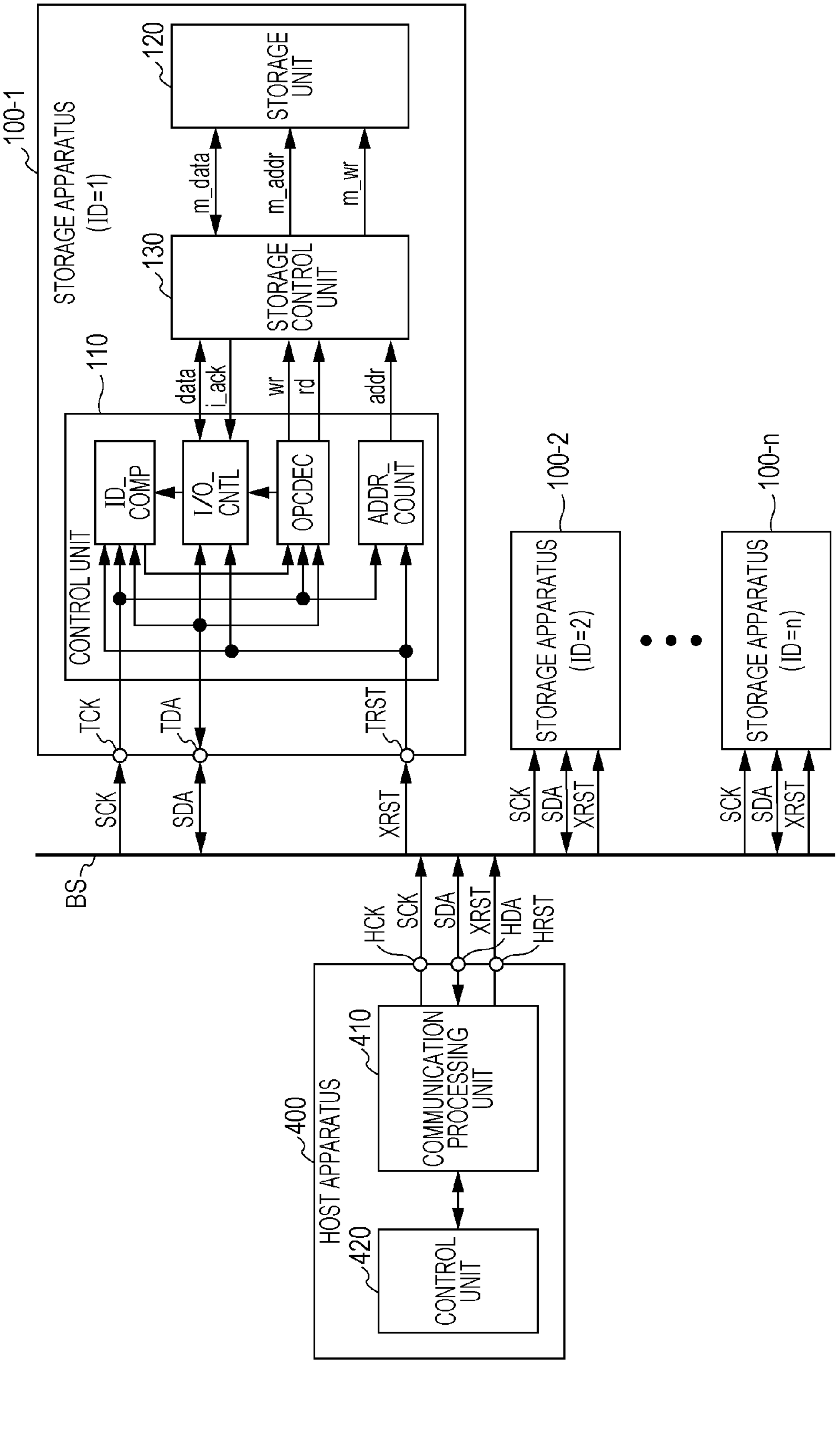
FIG. 1 illustrates a basic example of the configuration of storage devices and a host device.

FIG. 1 illustrates a basic example of the configuration of storage devices and a host device according to this embodiment. Each of storage devices 100 according to this embodiment includes a control unit 110, a storage unit 120, a storage control unit 130, a clock terminal TCK, and a data terminal TDA. Meanwhile, a host device 400 according to this embodiment includes a communication processing unit 410, a control unit 420, a clock terminal HCK, and a data terminal HDA. It should be noted that the storage devices and the host device according to this embodiment are not limited to the configuration illustrated in FIG. 1; many variations thereupon are possible, such as omitting some of the constituent elements, replacing those constituent elements with other constituent elements, adding other constituent elements, and so on.

The storage devices 100 (100-1 to **100-*n*) are connected to the host device 400 via a bus BS. The bus BS includes, for example, a clock signal line SCK, a data signal line SDA, and a reset signal line XRST, as shown in FIG. 1. The host device 400 supplies a clock to the plurality of storage devices 100-1 to 100-*n* via the clock signal line SCK. The host device 400 also exchanges data and the like with the storage devices 100 via the data signal line SDA. Furthermore, the host device 400 outputs reset signals to the plurality of storage devices 100-1 to 100-*n*** via the reset signal line XRST.

The plurality of storage devices 100-1 to **100-*n* each have ID information, and by specifying this ID information, the host device 400 can send commands, data, and so on to one of the storage devices of the plurality of storage devices 100-1 to 100-*n*. For example, in FIG. 1, the ID information of a first storage device 100-1 is ID=1, whereas the ID information of a second storage device 100-2** is ID=2.

The host device 400 can send commands and the like simultaneously to the plurality of storage devices connected to the bus BS. In other words, the host device 400 can send commands and the like as broadcasts. In this case, the commands and the like can be sent as broadcasts by specifying, for example, an ID=0 as the ID information for specifying the plurality of storage devices.

Each of the storage devices 100 includes the clock terminal TCK, the data terminal TDA, and a reset terminal TRST. The clock signal line SCK is connected to the clock terminal TCK, the data signal line SDA is connected to the data terminal TDA, and the reset signal line XRST is connected to the reset terminal TRST.

The control unit 110 of each of the storage devices 100 carries out communication processes with the host device 400 that is connected thereto via the bus BS. To be more specific, as shown in, for example, FIG. 1, commands, data to be written, and so on sent from the host device 400 via the data signal line SDA are received, and data read out from the storage unit 120, an acknowledgment (mentioned later), and so on are sent to the host device 400 via the data signal line SDA, based on the clock and reset signals from the host device 400.

The storage unit 120 is a non-volatile memory device such as an EEP ROM, a ferroelectric memory, or the like, and data is written thereinto from the host device 400. The storage control unit 130 controls the access to the storage unit 120.

The control unit 110 includes, for example, an ID comparator ID_COMP, an I/O controller I/O_CNTL, an operation code decoder OPCDEC, and an address counter ADDR_COUNT. The ID comparator ID_COMP determines whether or not ID information sent from the host device 400 matches the ID information of the storage device to which that ID comparator ID_COMP belongs. In the case where the ID information does match, an enable signal is outputted to the operation code decoder OPCDEC, and the operation code decoder OPCDEC decodes a command (operation code) sent from the host device 400. On the other hand, in the case where the ID information sent from the host device 400 does not match, the command that has been sent is ignored.

Specifically, in the case where the command sent from the host device 400 is a write command, the I/O controller I/O_CNTL receives the data to be written from the host device 400, and outputs the received data to be written "data" to the storage control unit 130. The storage control unit 130 writes memory data m_data into the storage unit 120 based on a write instruction wr from the operation code decoder OPCDEC. Address information addr at the time of this write is generated by the address counter ADDR_COUNT based on the clock supplied from the host device 400, and the data to be written is written into sequential addresses in the storage unit 120 sequentially, or in other words, in the order in which the data was sent.

When the data to be written has been successfully written into the storage unit 120, the storage control unit 130 outputs an internal acknowledgment signal i_ack to the I/O controller I/O_CNTL. The I/O controller I/O_CNTL then returns an acknowledgment ACK to the host device 400 in the case where acknowledgment return request information has been received in the broadcast from the host device 400. The host device 400 can recognize that the data has been successfully written into the storage devices by receiving the acknowledgment ACK. Details of the acknowledgment ACK will be given later.

In the case where the command sent from the host device 400 is a readout command, the storage control unit 130 reads out the memory data m_data from the storage unit 120 based on a readout instruction rd from the operation code decoder OPCDEC. The address information addr at the time of the readout is also generated by the address counter ADDR_COUNT based on a clock supplied from the host device 400, and is read out sequentially.

The host device 400 includes the communication processing unit 410, the control unit 420, the clock terminal HCK, the data terminal HDA, and a reset terminal HRST. The communication processing unit 410 carries out communication processes with the plurality of storage devices 100-1 to **100-*n* connected thereto via the bus BS. The control unit 420 controls the communication processing unit 410**.

When the period for writing data into the plurality of storage devices 100-1 to **100-*n* has ended, the communication processing unit 410 sends the acknowledgment return request information as a broadcast and performs a process for receiving the acknowledgments from the plurality of storage devices 100-1 to 100-*n***. The acknowledgment return request information is outputted to the data terminal HDA, and the clock for receiving the acknowledgment is outputted to the clock terminal HCK.

With the storage devices and the host device according to this embodiment, the control unit 110 returns an acknowledgment to the host device 400 in the case where two conditions have been fulfilled. The first condition is that the acknowledgment return request information sent as a broadcast by the host device 400 is received after the period for the host device 400 to write data into the plurality of storage devices 100-1 to **100-*n* has ended. The second condition is that the data has been successfully written into the storage unit 120** of the storage device itself.

By doing so, the host device 400 can receive acknowledgments from all of the storage devices 100 collectively after the data has been successfully written into the plurality of storage devices 100-1 to **100-*n*. As a result, the host device 400 can determine whether or not the data has been written successfully into each of the storage devices 100**, and the amount of time required for data writing can be reduced.

Figure 2:
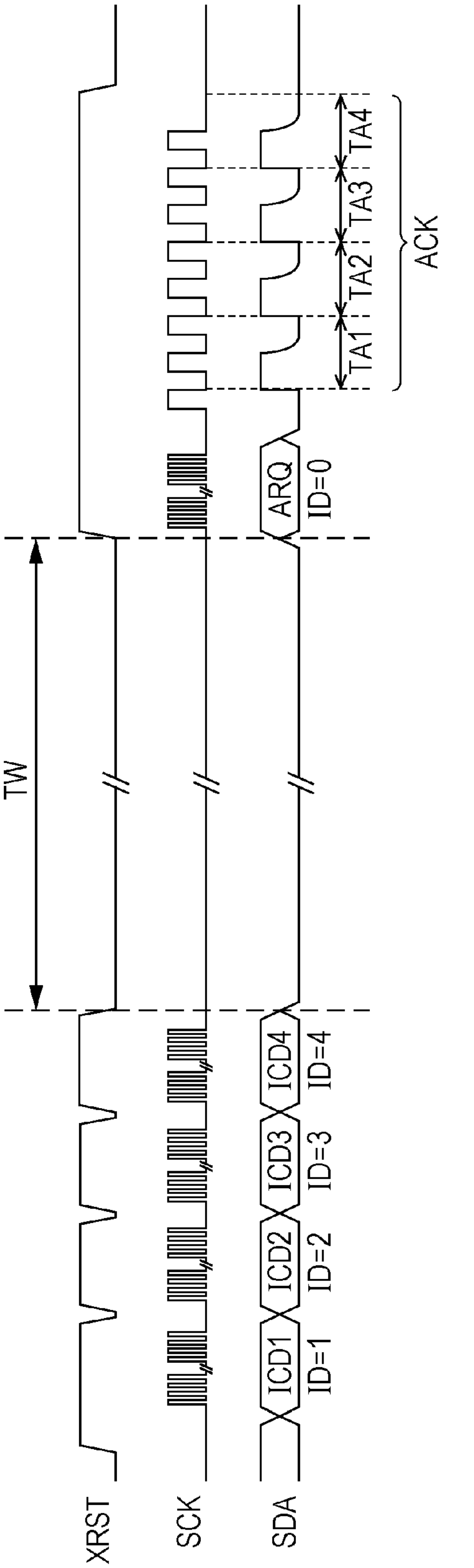
FIG. 2 is a timing chart illustrating the returning of an acknowledgment.

FIG. 2 is a timing chart illustrating the returning of an acknowledgment in the storage devices according to this embodiment. FIG. 2 illustrates the signal waveforms of a reset signal XRST, a clock signal SCK, and a data signal SDA. Although FIG. 2 illustrates a case in which four storage devices are connected, it should be noted that other numbers may be employed as well.

In the case where the reset signal XRST is H level (a high-potential level, defined broadly as a first logical level), the storage devices 100 are in a reset cancel state, whereas in the case where the reset signal XRST is L level (a low-potential level, defined broadly as a second logical level), the storage devices 100 are in a reset state. During the period in which the reset signal XRST is H level, or in other words, the period in which the reset is cancelled, data to be written is sent from the host device 400 to the storage devices 100.

Specifically, as shown in FIG. 2, the ID information, the write command, and the data to be written are sent in order based on the clock signal SCK. For example, ICD1 in FIG. 2 indicates the timing at which the ID information (ID=1), the write command, and the data to be written are sent to the first storage device 100-1. Likewise, ICD2 to ICD4 indicate the timings at which the ID information (ID=2 to 4), the write command, and the data to be written are sent to the second to fourth storage devices 100-2 to 100-4, respectively.

After these items have been sent to the first through fourth storage devices, the reset signal XRST is set to L level and an acknowledgment wait period TW starts. After the acknowledgment wait period TW has passed, the host device 400 once again sets the reset signal XRST to H level, and sends acknowledgment return request information ARQ as a broadcast to the storage devices 100. As the acknowledgment return request information ARQ, the control unit 110 of each of the storage devices 100 may receive a command requesting an acknowledgment return sent as a broadcast, or may receive ID information specifying a plurality of storage devices.

The broadcasted acknowledgment return request information ARQ may be a command that requests the return of an acknowledgment, or may be ID information specifying the plurality of storage devices, such as ID=0 or the like. Alternatively, the acknowledgment return request information ARQ may be both the ID information specifying the plurality of storage devices and the command that requests the return of an acknowledgment.

In the case where the data to be written has been successfully written into the storage unit 120 of the storage device 100, the control unit 110 returns the acknowledgment ACK to the host device 400 during the return period that corresponds to the ID information of that storage device 100 after receiving the acknowledgment return request information ARQ. Specifically, the control unit 110 of each of the storage devices 100 returns the acknowledgment ACK during an mth (where m is an integer in which $1 \leq m \leq n$) return period corresponding to its own ID information, from among first through nth (where n is an integer greater than or equal to 2) return periods.

For example, in FIG. 2, the first storage device (ID=1) returns the acknowledgment ACK during a first return period TA1. The second storage device (ID=2) returns the acknowledgment ACK during a second return period TA2, and in the same manner, the third and fourth storage devices (ID=3, 4) return acknowledgments ACK during third and fourth return periods TA3 and TA4, respectively.

The host device 400 receives, in the respective first through nth return periods that follow the sending of the acknowledgment return request information ARQ, the acknowledgments ACK from the storage devices 100 having ID information corresponding to the respective return periods.

The acknowledgment ACK is a signal at a logical level that expresses an acknowledgment (a write completion notification) and is outputted to the data terminals TDA of the storage devices 100 based on the clock signal SCK. Specifically, as shown in FIG. 2, for example, the acknowledgment ACK is a signal that is at H level in the first halves of the respective return periods TA1 to TA4 but that drops gradually to L level in the second halves of those periods. Note that the signal expressing the acknowledgment ACK is not limited to the signal waveform shown in FIG. 2.

The return periods Tm corresponding to the ID information of the respective storage devices have their timings regulated based on the clock signal SCK supplied by the host device 400, and each of the storage devices 100 can recognize the timing of their own corresponding return period Tm by counting the clock signal SCK. Meanwhile, because the host device 400 can determine the presence/absence of the acknowledgment ACK in the return periods Tm corresponding to the respective storage devices, the host device 400 can specify any storage devices into which data has not been written successfully. The host device 400 can then carry out a rewrite (a retry) for storage devices into which data has not been written successfully.

The acknowledgment wait period TW is a period in which, after the data to be written has been sent to the plurality of storage devices, the host device 400 waits to send the acknowledgment return request information ARQ as a broadcast. In other words, the host device 400 outputs the acknowledgment return request information ARQ after the acknowledgment wait period TW has passed. To be more specific, in the case where the length of a period required to write data into the storage unit 120 of a storage device 100 (that is, a write required time period) is taken as tTM, a length tTW of an acknowledgment wait period tTW fulfills the relationship $tTM \leq tTW < 2 \times tTM$.

In this manner, the host device 400 can stand by until data has been successfully written into the final storage device, from among the plurality of storage devices, to which the data was sent, and that storage device is capable of returning an acknowledgment. In the example shown in FIG. 2, by providing the acknowledgment wait period TW, the host device can stand by until data has been written into the storage unit of the fourth storage device (ID=4), which is the last device to which data has been sent, and that storage device is capable of returning an acknowledgment.

Figure 3:
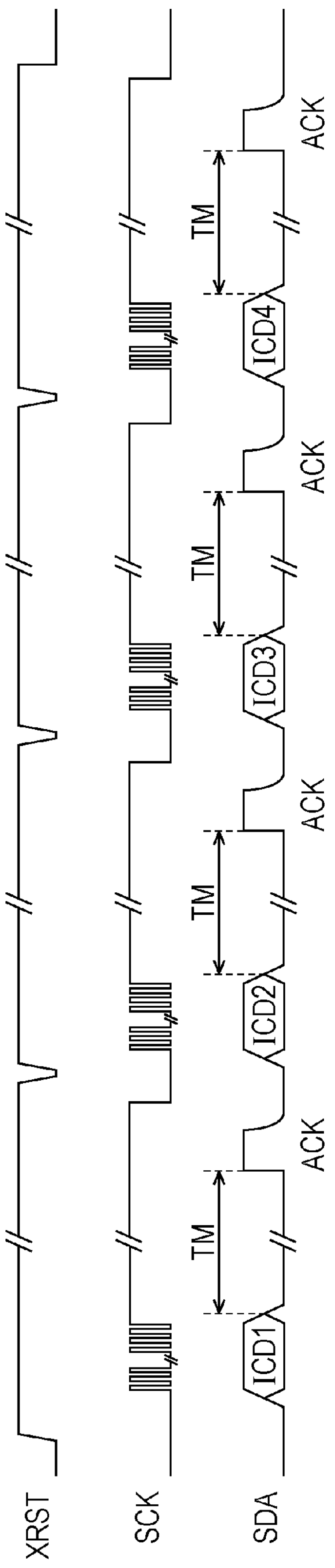
FIG. 3 is a timing chart illustrating a comparative example.

FIG. 3 illustrates, as a comparative example, a timing chart for a configuration in which an acknowledgment is returned after the writing into each of the storage devices is completed, as opposed to returning the acknowledgments collectively after all of the writes have been completed.

In the comparative example shown in FIG. 3, for example, the ID information (ID=1), the write command, and the data to be written are sent to the first storage device (ID=1) (ICD1, in FIG. 3), and after the data has been written into the storage unit of the first storage device, the acknowledgment ACK is returned. Next, data and so on are sent to the second storage device (ID=2) in the same manner, and after that data has been successfully written, the acknowledgment ACK is returned.

As shown in FIG. 3, in the comparative example, the acknowledgment ACK is returned from the storage device during a period spanning from when the storage device has received the data to be written until the data has been successfully written, or in other words, after the write required time period TM has passed. Accordingly, as shown in FIG. 3, in the case where, for example, four storage devices are connected, a length of time that is four times as long as the write required time period TM ($4 \times tTM$) is required, in addition to the time required to communicate the data and so on. Normally, the time for writing the data into the storage unit is longer than the time required for communication. For example, the amount of time required to communicate the data and so on to a single storage device is approximately 100 μs, but the length of the write required time period TM is approximately 5 ms. Accordingly, with the comparative example as shown in FIG. 3, the overall length of the write required time period is approximately 20 ms.

However, with the storage devices and host device according to this embodiment, as shown in FIG. 2, it is sufficient to provide a single acknowledgment wait period TW, and the length tTW of this acknowledgment wait period TW fulfills the relationship $tTM \leq tTW < 2 \times tTM$, as mentioned above. For example, in the case where tTM=5 ms, the relationship is 5 ms$\leq$tTW<10 ms, and thus the amount of time required for the data write process is shorter than that shown in the comparative example of FIG. 3. Meanwhile, the overall write processing time increases in proportion to the number of storage devices in the comparative example; however, with the storage devices and the host device according to this embodiment, although the time required for communication does increase, the length of the acknowledgment wait period TW does not.

In this manner, according to the storage devices and the host device of this embodiment, the host device can, in a process for writing data into each of a plurality of storage devices connected to a bus, receive the acknowledgments ACK collectively after the data has been sent to the storage devices, which makes it possible to reduce the overall write processing time. Furthermore, even in the case where the number of storage devices has increased, the length of the acknowledgment wait period does not increase, which makes it possible to suppress the overall write processing time.

2. Data Write Process

Figure 4:
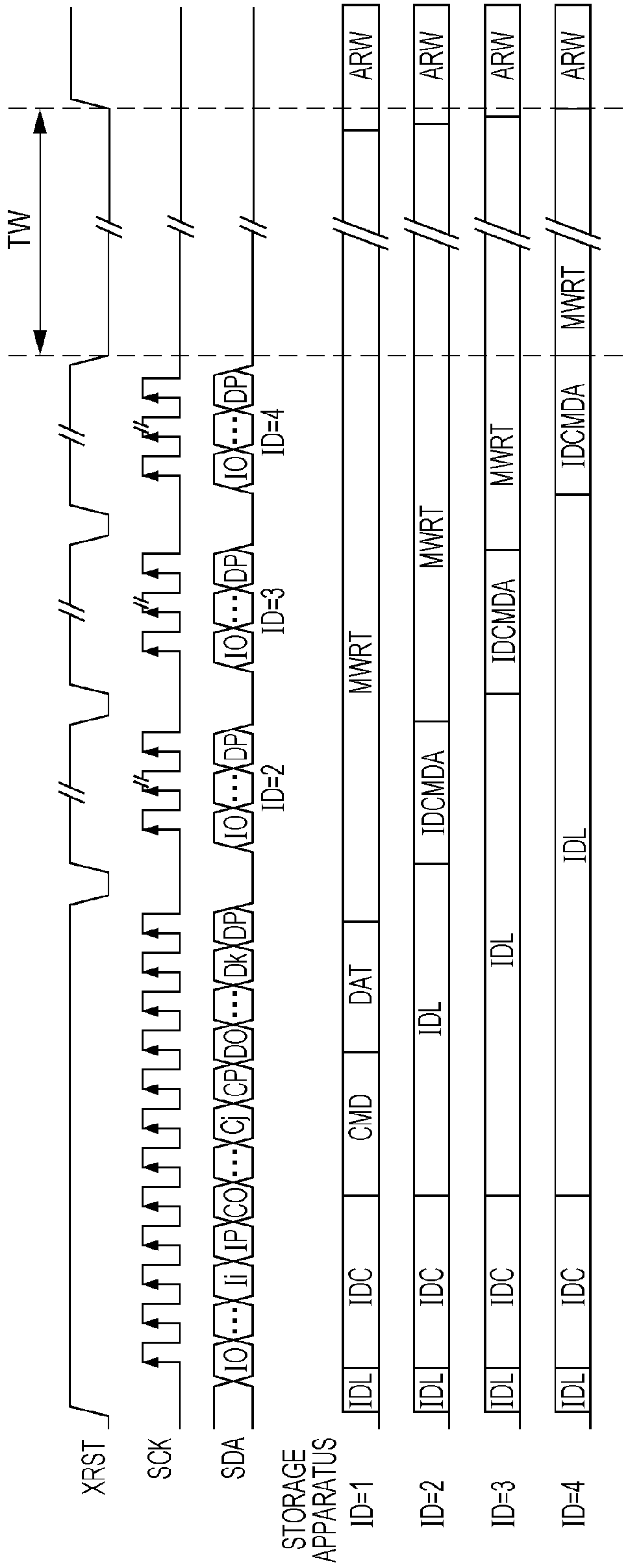
FIG. 4 is a detailed timing chart illustrating processes leading up to the writing of data.

FIG. 4 is a detailed timing chart illustrating from when data is sent from the host device 400 to the first to fourth storage devices 100-1 to 100-4 up until when the data is written into the storage units 120 of the storage devices 100.

First, the host device 400 sends the ID information, the write command, and the data to the first storage device (ID=1). As shown in FIG. 4, the ID information is, for example, configured of i+1 bits for I0 to Ii (where i is a natural number), and a parity bit IP is added thereto. Meanwhile, the write command is, for example, configured of j+1 bits for C0 to Cj (where j is a natural number), and a parity bit CP is added thereto. Furthermore, the data is, for example, configured of k+1 bits for D0 to Dk, and a parity bit DP is added thereto. The parity bits IP, CP, and DP are bits added for parity checks, and are bits that are added so that the number of bits 1 is always even or odd.

The ID comparator ID_COMP of the first storage device (ID=1) recognizes, in an ID recognition period IDC, that the received ID information and the ID information of the first storage device (ID=1) match. Then, in a command recognition period CMD, the operation code decoder OPCDEC recognizes that the received command is a write command. Next, in a data receiving period DAT, the I/O controller I/O_CNTL receives the data and outputs the data to the storage control unit 130. The storage control unit 130 writes the data into the storage unit 120 in a memory write period MWRT, which follows thereafter. When the data has been successfully written, the storage control unit 130 outputs the internal acknowledgment signal i_ack to the I/O controller I/O_CNTL. Thereafter, the first storage device waits for the host device 400 to send the acknowledgment return request information ARQ during an acknowledgment return request information wait period ARW.

On the other hand, the ID comparator ID_COMP of the second storage device (ID=2) recognizes, in the first ID recognition period IDC, that the received ID information and the ID information of the second storage device (ID=2) do not match. The second storage device then enters an idling period IDL, without receiving the command and the data. In the case where the received ID information and the ID information of the second storage device match in the ID recognition period IDC that follows thereafter, the write command and the data are received. Note that in FIG. 4, the ID recognition period IDC, the command recognition period CMD, and the data receiving period DAT are collectively expressed as "IDC-MDA". Then, in the memory write period MWRT, the data is written into the storage unit 120, and in the case where the data has been successfully written, the second storage device enters the acknowledgment return request information wait period ARW.

In the same manner, the third and fourth storage devices (ID=3, 4) also receive write commands and data in the case where the received ID information and the ID information of the storage device in question match; the data is then written into the storage unit 120 in the memory write period MWRT, and in the case where the data has been successfully written, the storage device in question enters the acknowledgment return request information wait period ARW. As shown in FIG. 4, the acknowledgment wait period TW is a period necessary for the data to be written into the storage unit 120 for the fourth storage device (ID=4), which is the last storage device into which a data write is to be executed.

Figure 5:
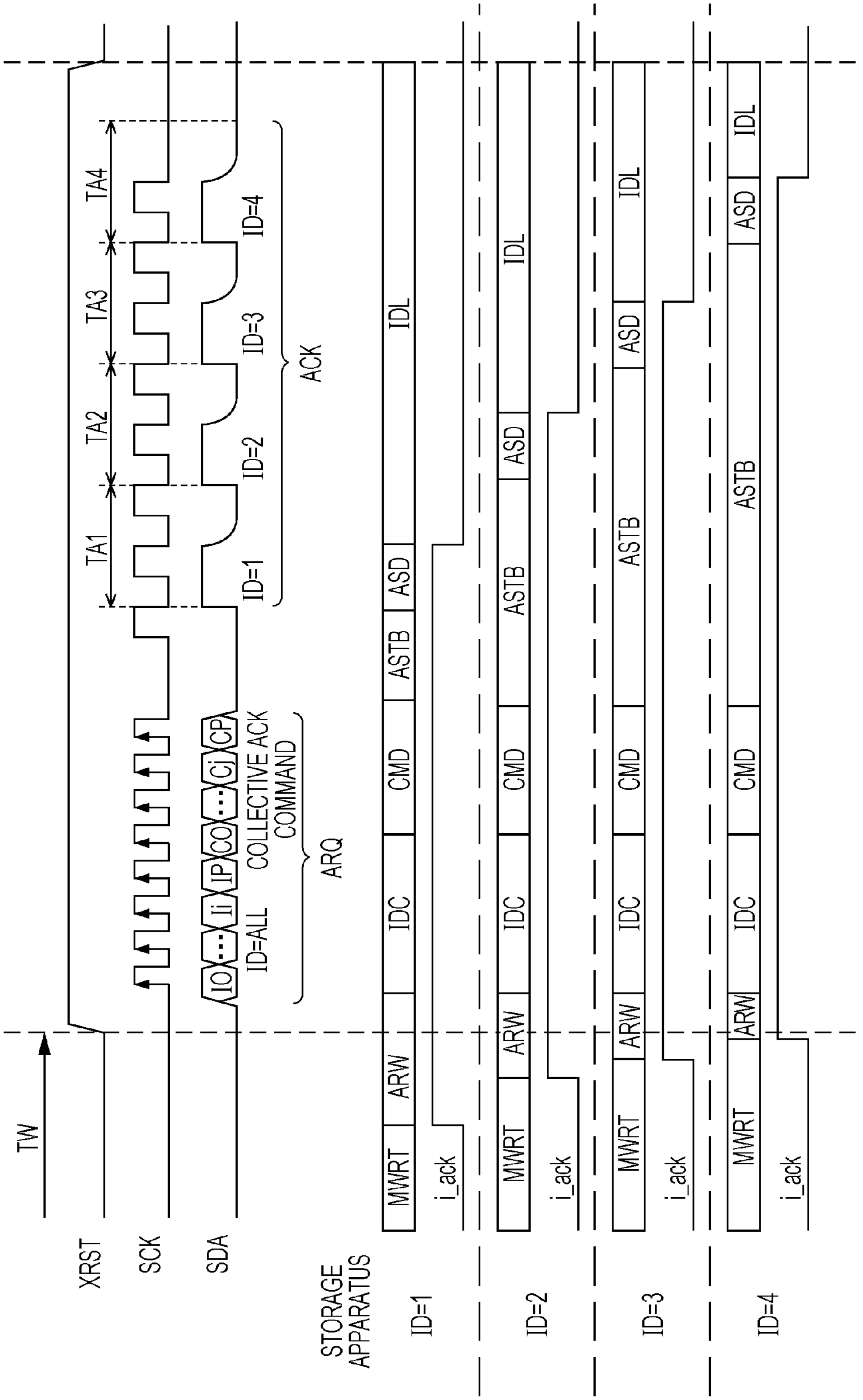
FIG. 5 is a detailed timing chart illustrating processes leading up to the returning of an acknowledgment.

FIG. 5 is a detailed timing chart spanning from when the acknowledgment return request information ARQ has been sent from the host device 400 to when the storage devices 100 return the acknowledgments ACK, after the data has been written into the storage units 120 of the storage devices 100.

After the acknowledgment wait period TW has passed, the host device 400 sets the reset signal XRST to H level. As this point in time, the data has been successfully written into the fourth storage device (ID=4), and thus all of the first through fourth storage devices are in the acknowledgment return request information wait period ARW. Next, the host device 400 sends the acknowledgment return request information ARQ as a broadcast.

The acknowledgment return request information ARQ can, as shown in FIG. 5, be configured of ID information specifying a plurality of storage devices (ID=ALL or the like) and a command requesting a collective ACK return. Alternatively, the acknowledgment return request information ARQ may be either the ID information specifying a plurality of storage devices or the command requesting a collective ACK return.

The first through fourth storage devices receive the acknowledgment return request information ARQ in their respective ID recognition periods IDC and command recognition periods CMD, recognize the collective ACK return request command, and wait for the return period corresponding to their own ID information during an ACK return standby period ASTB that follows thereafter. The storage devices then return acknowledgments ACK in the return periods corresponding to their own ID information.

Specifically, as shown in FIG. 5, the first storage device (ID=1) outputs the acknowledgment ACK to its own data terminal TDA in the corresponding first return period TA1. Likewise, the second to fourth storage devices also output acknowledgments ACK to their own data terminals TDA in the second to fourth return periods TA2 to TA4, respectively. In FIG. 5, each storage device has its data terminal TDA set to H level in an ACK output period ASD, and is set to a high-impedance state in all other periods. By doing so, the signal level of the data signal line SDA is H level in the first half of the return periods TA1 to TA4, and gradually falls to L level in the second half of those periods. As will be mentioned later, it should be noted that the signal expressing the acknowledgment ACK is not limited to the signal waveform shown in FIG. 5, and other signal waveforms may be used as well.

Figure 6A:
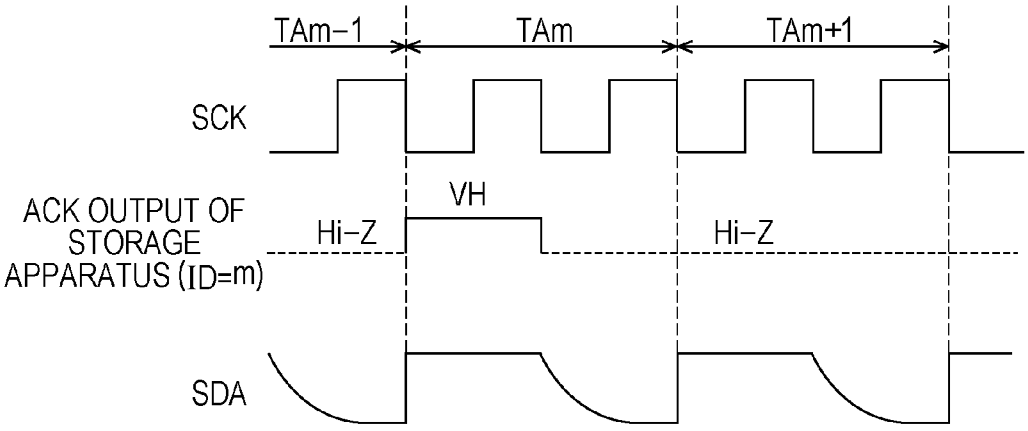
FIGS. 6A and 6B are diagrams illustrating an acknowledgment signal waveform.
Figure 6B:
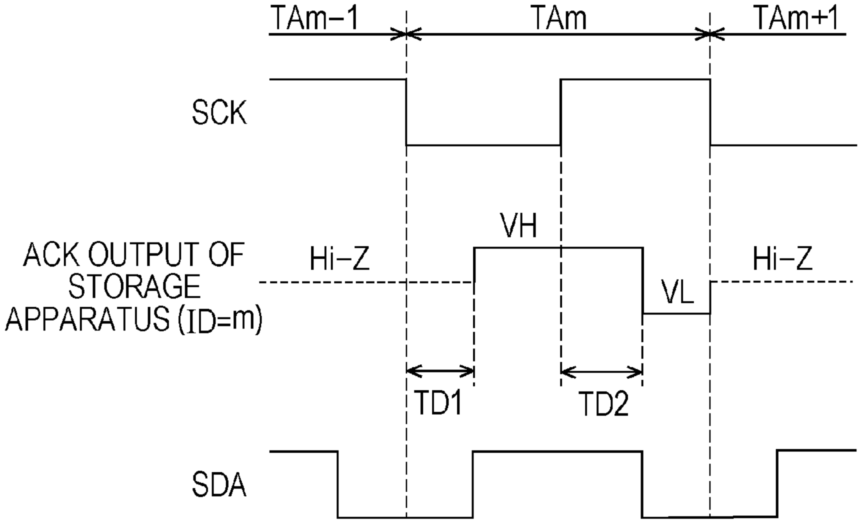

FIGS. 6A and 6B are diagrams illustrating signal waveforms of the acknowledgment ACK outputted by the storage devices 100.

The ACK signal waveform illustrated in FIG. 6A is the ACK signal waveform illustrated in FIGS. 2 and 5. In other words, the storage device 100 sets its data terminal TDA to H level VH in the first half of the return period TAm that corresponds to the ID information (ID=m) of that storage device 100, and sets the data terminal TDA to a high-impedance state Hi-Z in all other periods. After the charge is discharged by a resistance element (a terminal resistance element) provided between the data terminal HDA and a second power source VSS (low-potential power source) of the host device 400, the voltage level of the data signal line SDA gradually drops to L level in the second half of TAm. Because the voltage level has dropped to L level in the second half of TAm, interference with the next return period Tm+1 can be prevented.

FIG. 6B is another example of the ACK signal waveform. With the ACK signal waveform shown in FIG. 6B, the control unit 110 of the storage device 100 changes the voltage level of the data terminal TDA from the high-impedance state Hi-Z to H level VH (broadly defined as the first logical level) in the return period TAm corresponding to its own ID information (ID=m), and then changes the voltage level from H level VH to L level VL (broadly defined as the second logical level). Then, the voltage level of the data terminal TDA is set to the high-impedance state Hi-Z in all periods aside from the return period Tm.

Specifically, the voltage level is set to the high-impedance state Hi-Z from when the return period Tm starts to when a first delay time TD1 has passed, after which the voltage level is set to H level. Then, the voltage level is held at H level from when the second half of the return period Tm has started until when a second delay time TD2 has passed, after which the voltage level is set to L level. The voltage level is then restored to the high-impedance state Hi-Z when the next return period Tm+1 has started.

With the ACK signal waveform shown in FIG. 6B, the voltage level of the data terminal TDA is changed from H level VH to L level VL in the second half of the return period Tm, which makes it possible to cause the voltage level of the data signal line SDA to drop rapidly. Doing so makes it possible to shorten the length of the return period Tm, which in turn makes it possible to further reduce the amount of time needed to return the acknowledgment ACK. Furthermore, because the voltage level of the data signal line SDA is set to L level at the beginning and end of the return period Tm, interference with the return periods Tm−1 and Tm+1 therebefore and thereafter can be prevented.

As described thus far, according to the storage devices and the host device of this embodiment, the host device can, in a process for writing data into each of the plurality of storage devices connected to a bus, receive the acknowledgments ACK collectively after the data has been sent to the storage devices. Doing so makes it unnecessary to provide acknowledgment wait periods for each of the storage devices; and because it is only necessary to provide a single acknowledgment wait period, the overall write processing time can be reduced. Furthermore, even in the case where the number of storage devices has increased, the length of the acknowledgment wait period does not increase, which makes it possible to suppress the overall write processing time.

3. System, Liquid Receptacle, and Circuit Board

Figure 7:
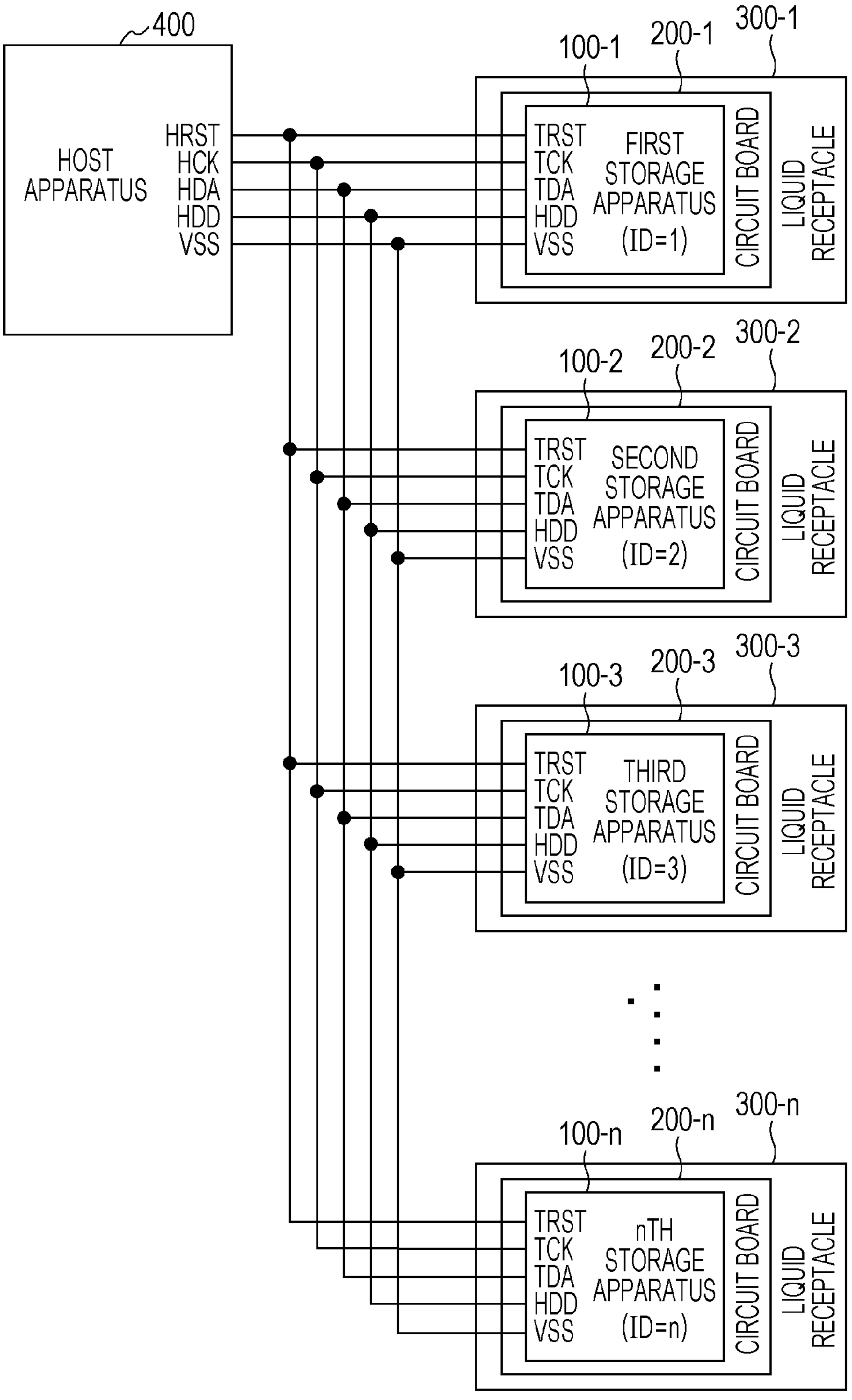
FIG. 7 illustrates an example of the basic configuration of a system.

FIG. 7 illustrates an example of the basic configuration of a system according to this embodiment. The system according to this embodiment is, for example, an ink jet printer, and includes: a first storage device 100-1 to an nth (where n is an integer greater than or equal to 2) storage device 100-*n*; n circuit boards 200-1 to 200-*n* in which the respective storage devices are mounted; n liquid receptacles 300-1 to 300-*n* provided with the respective circuit boards; and the host device 400. It should be noted that the system according to this embodiment is not limited to the configuration illustrated in FIG. 7; many variations thereupon are possible, such as omitting some of the constituent elements, replacing those constituent elements with other constituent elements, adding other constituent elements, and so on.

The following describes an example of a case in which the host device 400 is the main unit of an ink jet printer, the liquid receptacles 300 are ink cartridges, and the circuit boards 200 are circuit boards provided in the ink cartridges. However, it should be noted that in this embodiment, the host device, the liquid receptacles, and the circuit boards may be other devices, receptacles, or circuit boards. For example, the host device may be a memory card reader/writer, and the circuit boards may be circuit boards provided in memory cards.

The first storage device 100-1 to the nth storage device 100-*n* each include the reset terminal TRST, the clock terminal TCK, the data terminal TDA, a first power source terminal VDD, and a second power source terminal VSS. Each of the n storage devices 100-1 to 100-*n* includes the storage unit 120 (for example, a non-volatile memory or the like), and in each of the storage units 120 is stored ID information (for example, ID=1, ID=2, ID=3, and so on) for identifying the respective n liquid receptacles (for example, ink cartridges) 300-1 to 300-*n*. Different IDs are added for different types of liquid held in the liquid receptacles, such as the color of the liquid and so on.

The host device 400 is, for example, the main printer unit, and includes a host-side reset terminal HRST, a host-side clock terminal HCK, a host-side data terminal HDA, a first power source terminal VDD, and a second power source terminal VDD.

As described above, according to the storage devices, the host device, and the system of this embodiment, the host device (main printer unit) can, in a process for writing data into each of the plurality of storage devices connected to a bus, receive the acknowledgments ACK collectively after the data has been sent to the storage devices, which makes it possible to reduce the overall write processing time.

With ink jet printers and the like, the ink cartridges (liquid receptacles) are normally configured to be replaceable, and thus it is easy for contact problems to occur at the areas that form electrical connection portions. If, for example, a contact problem occurs at a data terminal during communication, a communication error can result, and there is thus the risk that data will be written erroneously. Alternatively, if a contact problem occurs at a power source terminal during operations for writing data into a storage unit, there is the risk that a write error will occur. It is desirable to reduce the amount of processing time for writing from the host device to the storage devices in order to suppress the occurrence of such problems.

With the storage devices, the host device, and the system according to this embodiment, it is possible to reduce the time required by processing for writing data from the host device into the storage devices, which makes it possible to reduce the occurrence of problems caused by contact problems and the like at areas that form electrical connection portions.

Figure 8:
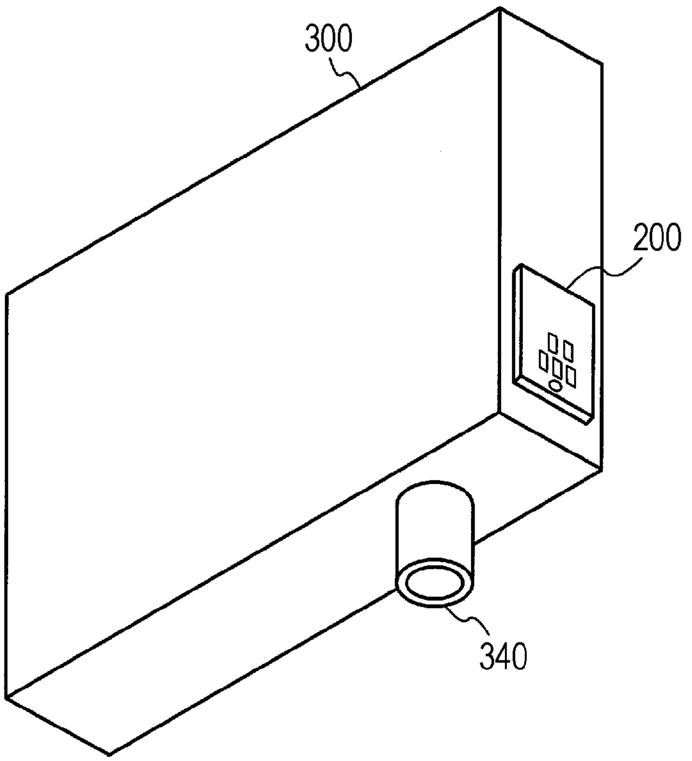
FIG. 8 is illustrates an example of the configuration of a liquid receptacle in detail.

FIG. 8 illustrates an example of the detailed configuration of the liquid receptacle (ink cartridge) 300 according to this embodiment. An ink chamber (not shown) for holding ink is formed within the liquid receptacle 300. Furthermore, an ink supply opening 340 that communicates with the ink chamber is provided in the liquid receptacle 300. This ink supply opening 340 is used to supply ink into a print head unit when the liquid receptacle 300 is mounted in the printer.

The liquid receptacle 300 includes a circuit board 200. The circuit board 200 is provided with the storage device 100 according to this embodiment, and stores data such as the amount of ink that is consumed, exchanges data with the host device 400, and so on. The circuit substrate 200 is implemented as, for example, a printed circuit board, and is provided on the surface of the liquid receptacle 300. Terminals such as the first power source terminal VDD and so on are provided in the circuit board 200. When the liquid receptacle 300 is mounted in the printer, these terminals make contact with (that is, are electrically connected to) terminals in the printer, which makes it possible to exchange power, data, and so on.

Figure 9A:
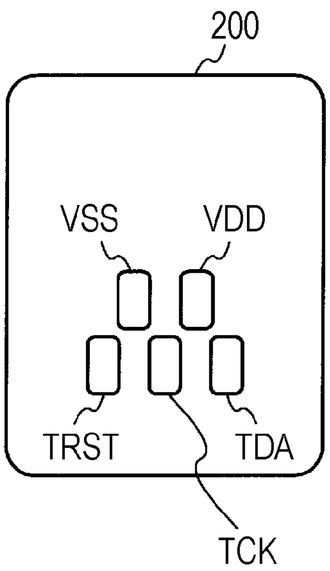
FIGS. 9A and 9B are examples illustrating the configuration of a circuit substrate in detail.
Figure 9B:
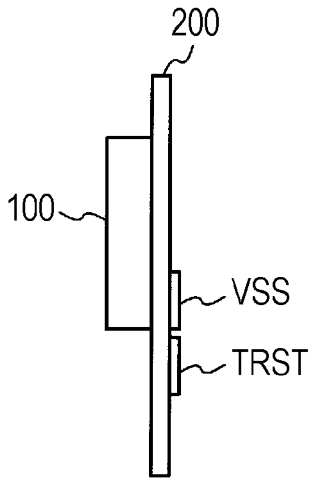

FIGS. 9A and 9B illustrate an example of the configuration of the circuit board 200, in which the storage device 100 according to this embodiment is provided, in detail. As shown in FIG. 9A, a terminal group including a plurality of terminals is provided on the surface of the circuit board 200 (the surface that connects to the printer). This terminal group includes the first power source terminal VDD, the second power source terminal VSS, the reset terminal TRST, the clock terminal TCK, and the data terminal TDA. Each terminal is implemented as a metal terminal formed in, for example, a rectangular shape (an approximately rectangular shape). Each terminal is connected to the storage device 100 via a wiring pattern layer, a through-hole, or the like (not shown) provided in the circuit board 200.

As shown in FIG. 9B, the storage device 100 according to this embodiment is provided on the rear surface of the circuit board 200 (that is, the rear side of the surface that is connected to the printer). The storage device 100 can be realized as, for example, a semiconductor storage device that includes an EEP ROM, a flash memory, a ferroelectric memory, or the like. Various types of data related to the ink, the liquid receptacle 300, or the like are stored in the storage device 100; for example, ID information for identifying the liquid receptacle 300, data regarding the amount of ink that is consumed, and so on is stored. The data indicating the amount of ink that is consumed is data indicating the cumulative total of the amount of ink, held within the liquid receptacle 300, that is consumed when printing is executed. The data indicating the amount of ink that is consumed may be information indicating the amount of ink within the liquid receptacle 300, or may be information indicating the ratio of the amount of consumed ink.

Although an embodiment has been described in detail thus far, it should be noted that many variations that do not depart from the novel content and effects of the invention will be apparent to one skilled in the art. Such variations should therefore be taken as being included within the scope of the invention. For example, in the specification or drawings, terms that have been used at least once along with different terms that have broader or the same meaning can be replaced with those terms in all areas of the specification or drawings. Furthermore, the configurations and operations of the storage devices, host device, circuit board, liquid receptacle, and system are not intended to be limited to those described in the embodiment, and many variations thereon are possible as well.

The entire disclosure of Japanese Patent Application No. 2010-214844, filed Sep. 27, 2010 is expressly incorporated by reference herein.

What is claimed is:

1. A storage device comprising:

a control unit that carries out a communication process with a host device that is connected via a bus;

a storage unit into which data from the host device is written; and a storage control unit that controls access to the storage unit, wherein the storage device is connected to the host device via bus; and the control unit returns an acknowledgment to the host device in the case where the control unit has received acknowledgment return request information broadcasted from the host device to a plurality of storage devices after a period in which data is written into the plurality of storage devices and the data has been successfully written into the storage unit;

wherein the control unit returns the acknowledgment to the host device in a return period that, of first through nth (where n is an integer greater than or equal to 2) return periods that follow the reception of the acknowledgment return request information, is an mth (where m is an integer greater than or equal to 1 and less than n) return period that corresponds to ID information of the storage device.

2. The storage device according to claim 1, further comprising:

a clock terminal; and a data terminal, wherein in the mth return period, the control unit outputs a signal of a logical level that expresses the acknowledgment to the data terminal based on a clock inputted to the clock terminal.

3. The storage device according to claim 2, wherein in the mth return period, the control unit changes the voltage level of the data terminal from a high-impedance state to a first logical level and then changes the voltage level from the first logical level to a second logical level, and in periods aside from the mth return period, sets the voltage level of the data terminal to the high-impedance state.

4. The storage device according to claim 1, wherein the control unit receives, as the acknowledgment return request information, a broadcasted command requesting the acknowledgment to be returned.

5. The storage device according to claim 1, wherein the control unit receives, as the acknowledgment return request information, ID information specifying the plurality of storage devices.

6. A host device comprising:

a communication processing unit that carries out communication processes with a plurality of storage devices connected via a bus; and a control unit that controls the communication processing unit, wherein after the end of a period for writing data into the plurality of storage devices, the communication processing unit sends acknowledgment return request information to the plurality of storage devices and carries out acknowledgment reception processings from the plurality of storage devices; and wherein in each return period of first through nth (where n is an integer greater than or equal to 2) return periods that follow the sending of the acknowledgment return request information, an acknowledgment is received from a storage device having ID information that corresponds to the return period.

7. The host device according to claim 6, further comprising:

a clock terminal; and a data terminal, wherein after the acknowledgment return request information has been outputted to the data terminal, a clock for receiving the acknowledgment is outputted to the clock terminal.

8. The host device according to claim 6, wherein assuming the length of a write required time period for writing the data into each of the plurality of storage devices is tTM and the length of an acknowledgment wait period is tTW, the acknowledgment return request information is outputted after the passage of an acknowledgment wait period that fulfills the relationship $tTM \leq tTW < 2 \times tTM$.

9. A circuit board comprising the storage device according to claim 1.

10. A circuit board comprising the storage device according to claim 1.

11. A circuit board comprising the storage device according to claim 4.

12. A circuit board comprising the storage device according to claim 5.

13. A liquid receptacle comprising the storage device according to claim 1.

14. A liquid receptacle comprising the storage device according to claim 1.

15. A liquid receptacle comprising the storage device according to claim 4.

16. A liquid receptacle comprising the storage device according to claim 5.

17. A system comprising:

a storage device, the storage device comprising:

a control unit that carries out a communication process with a host device that is connected via a bus;

a storage unit into which data from the host device is written; and a storage control unit that controls access to the storage unit, wherein the storage device is connected to the host device via bus; and the control unit returns an acknowledgment to the host device in the case where the control unit has received acknowledgment return request information broadcasted from the host device to a plurality of storage devices after a period in which data is written into the plurality of storage devices and the data has been successfully written into the storage unit;

wherein the control unit returns the acknowledgment to the host device in a return period that, of first through nth (where n is an integer greater than or equal to 2) return periods that follow the reception of the acknowledgment return request information, is an mth (where m is an integer greater than or equal to 1 and less than n) return period that corresponds to ID information of the storage device; and a host device, the host device comprising:

a communication processing unit that carries out communication processes with a plurality of storage devices connected via a bus; and a control unit that controls the communication processing unit, wherein after the end of a period for writing data into the plurality of storage devices, the communication processing unit sends acknowledgment return request information to the plurality of storage devices and carries out acknowledgment reception processings from the plurality of storage devices.

* * * * *